United States Patent Office 3,209,997
Patented Oct. 5, 1965

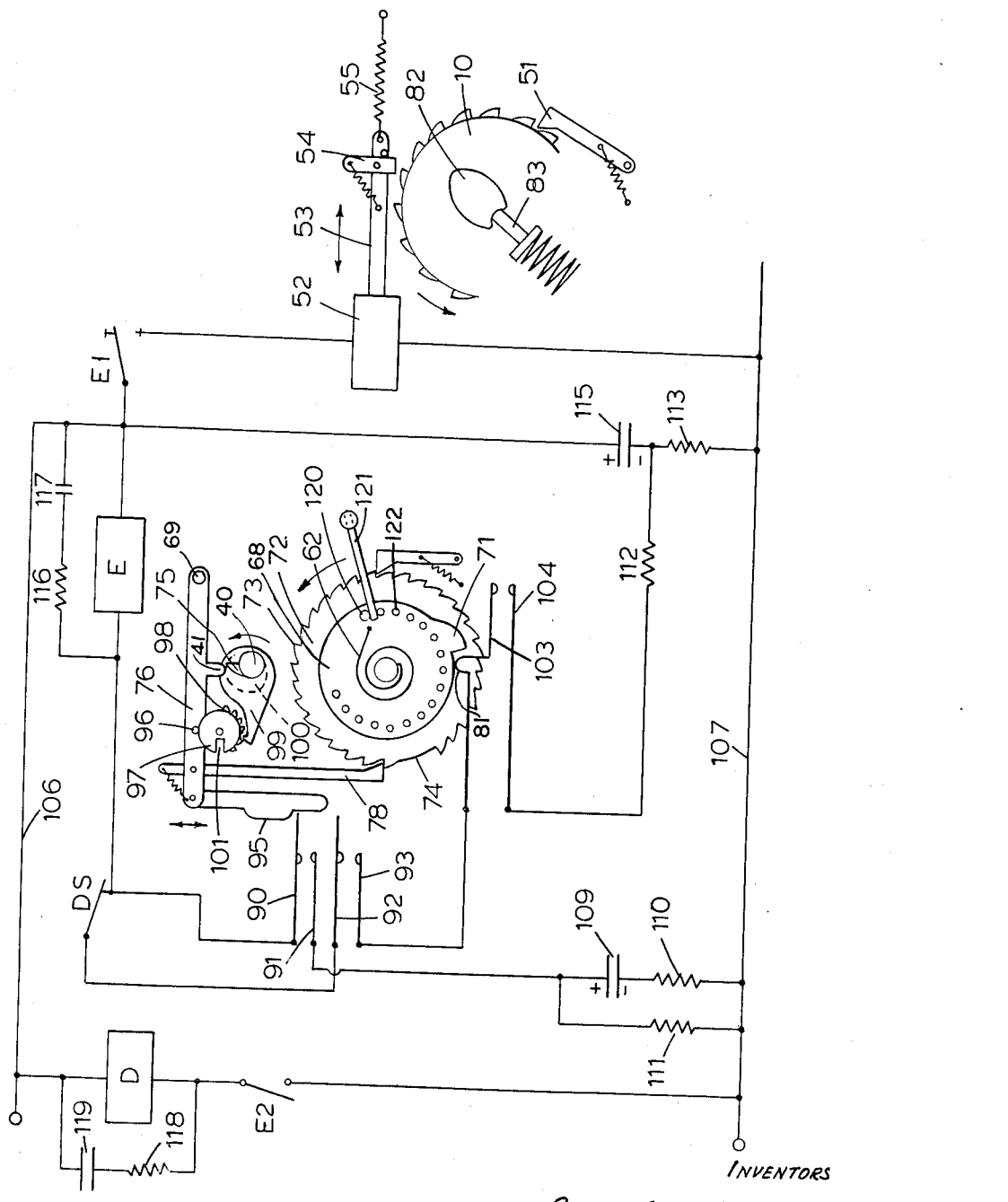

3,209,997
TAXIMETERS
George Cecil Steadman and Frederick Stephen Rudd, London, England, assignors to Geecen Limited, London, England, a British company
Filed May 20, 1963, Ser. No. 281,461
Claims priority, application Great Britain, Jan. 21, 1963, 2,543/63
5 Claims. (Cl. 235—30)

This invention relates to taximeters and its object is to provide simple and effective means for changing the rate of advance of a fare indicator, e.g. to provide an initial rate (commonly called a tariff) followed by a different rate (or second tariff) beyond an initial predetermined distance of travel and time when rate of travel of the vehicle is low or nil e.g. waiting time.

According to the present invention a taximeter comprises a rotary member, means for driving the rotary member alternately in accordance with distance of travel and time, a fare indicator, electro-magnetic fare indicator operating means, electric circuit means for supplying electric current pulses for operating the electro-magnetic means with a succession of advance movements, said circuit means including switch means for controlling said pulses and control means operatively connected with said rotary member and actuating said switch means for imparting a higher rate of fare advance pulses in high tariff period than in low tariff period.

By means of this invention the second tariff is changed (e.g. increased) not only in accordance with distance travelled but also in accordance with time. The tariff for waiting time can be changed without changing the escapement of the taximeter clock mechanism.

The invention will now be described by way of example with reference to the accompanying diagrammatic drawing. The accompanying drawing is a side elevational view with electrical diagram of a constructional form of the invention only such parts of the taximeter being shown as are necessary for the understanding of the present invention.

The taximeter has the usual fare indicator means which includes a toothed drum 10 the teeth of which are engaged by a non-return pawl 51. The drum actuates the usual fare indicator drums (not shown) and is driven by an electro-magnetic device in the form of a solenoid 52 having a movable core 53 which carries a pawl 54. When the solenoid is energised the core 53 moves to the left and the pawl 54 engages a tooth on drum 10 and applies a fare advance movement to it. When the current to the solenoid stops, the core is returned by a spring 55 and pawl 54 rides over the teeth of the drum 10. Cams such as 82 (one for each fare drum) serve for zeroising the fare drums under pressure of spring-loaded plungers such as 83. A shaft 40 is the usual time and distance shaft of a taximeter, i.e. it is driven according to distance travelled when the vehicle speed is above a predetermined low rate and is driven according to time when the vehicle is still hired but is stationary or travelling below that speed. The shaft 40 carries a cam 75 which engages a projection 41 on the lever 76 so as to raise the lever 76 once per revolution and allows it to fall again assisted by a spring, this all being well known.

The solenoid is energised by electric current controlled by the following means. Two switches 90, 91 and 92, 93 are arranged adjacent each other with arms 90, 92 respectively projecting into the path of a cam arm 95 carried by lever 76 which is pivotally mounted at 69. A pin 96 on lever 76 seats on a disc 97 that has ratchet teeth 98 driven by pawl 99 from an eccentric 100 on cam 75. The disc 97 prevents fall of lever 76 during the predetermined initial period. The disc 97 has a radial slot 101 in its periphery into which pin 96 can drop at the end of the initial period. Thus lever 76 and cam arm 95 have a sufficient movement during each drop to close switch 90, 91 and 92, 93 during low tariff period and during high tariff period so that at each drop of lever 76 switch 90, 91 is first closed and opened and immediately thereafter the switch 92, 93 is closed. A further switch 103, 104 is provided. A projection 81 on switch arm 103 seats on the periphery of a drum 68 and this drum has a peripheral projection 71. This drum is fixed to a drum 72 that has ratchet teeth 73 engaged by a pawl 78 carried by the lever 76. This pawl rotates drums 72, 68 step by step until the pawl 78 reaches an edentate part 74 of the drum 72. A non-return pawl 80 also engages the ratchet teeth 73. The switch 103, 104 is open during initial fare period and during low tariff period and is held closed by step 71 during high tariff period. A relay coil E is in series between a positive line 106 and a negative line 107 connected to a source of electrical D.C. supply and in a circuit which includes switch 90, 91 capacitor 109 (e.g. 100 mfd.) and a resistor 110 (e.g. 47 ohms). In parallel with capacitor 109, and resistor 110 is a resistor 111 of for example from 5K to 5 megohms. In parallel with the relay E is a circuit which includes a switch DS, the second advance switch 92, 93, switch 103, 104, resistor 112 (e.g. 47 ohms) and resistor 113 (e.g. 5K to 5 megohms). A capacitor 115 is disposed between resistors 112, 113, and the positive line 106. A resistor 116 (e.g. 47 ohms) and capacitor 117 (e.g. 100 mfd.) are shunted across the relay E and the latter controls two switches E1 and E2. Switch E1 is in series with the solenoid 52 connected across 106, 107, and switch E2 is connected with a relay coil D across 106, 107. The relay coil D is shunted by resistor 118 (e.g. 100 ohms) and by capacitors 119 (e.g. 100 mfd.) and controls switch DS.

In operation disc 97 rotates, and after the initial predetermined period the slot 101 moves below pin 96. Then, when lever 76 drops, the pin 96 enters the slot 101 and the cam arm 95 closes 90, 91 and then closes 92, 93. When 90, 91 is closed the capacitor 109 (normally discharged via resistor 111) draws current via relay E. This closes switch E1 and the solenoid 52 actuates the fare indicator drums 10. Simultaneously switch E2 closes. Capacitor 109 completes its charge as cam arm 95 moves past switch arm 90, and switch 90, 91 opens and switch 92, 93 also close but at this time are inoperative because third switch 103, 104 is open. Opening of relay switch E1 is delayed by the capacitor 117.

The reciprocation of pawl 99 thus causes disc 97 to rotate stepwise through a plurality of continuous turns, as the ratchet teeth 98 are disposed entirely about the periphery of disc 97. Once each rotation, however, pin 96 drops into slot 101, which causes lever 76 and pawl 78 to drop and engage a tooth 73 on drum 72 to cause drum 72 to turn one step. Thereafter, cam 75 engages projection 41 to raise pin 96 out of slot 101, after which the step-by-step rotation of disc 77 continues.

This operation continues during the low tariff period, characterized by the sending of one pulse for each turn of disc 97, until switch 103, 104 is closed by step 71. This event initiates the high tariff period, during which two pulses are sent for each revolution of disc 97. During the high tariff period, the negative pole of capacitor 115 (normally kept charged via resistor 113) is applied through switch 103, 104 to switch 92, 93, which then closed by cam arm 95 is applied to switch DS while relay E is actuated because relay D is energised when switch E1 and E2 are closed. When relay switches E1 and E2 open, and the delay capacitor 119 has discharged sufficiently, relay switch DS closes and capacitor 115 discharges into relay E. The solenoid 52 thereby receives a second impulse at each drop of lever 76. Resistors 110, 112 serve to limit current surge.

The above described construction can be altered if desired so that the low tariff rate follows the high tariff rate.

Drum 72 is rotatably adjustable in relation to drum 68 in order to vary the low tariff period. The adjustment may be effected by placing stop pin 120 in any of a series of holes 122. The stop pin engages an abutment 121 in the For Hire position. Pawls 51, 80, 78 are disengaged in the For Hire position when a spring 62 returns 68, 72 to the position shown.

We claim:

1. In a taximeter having a rotary member driven alternately in accordance with distance travelled and time, a cam on said rotary member, a lever actuated by said cam so as to oscillate at a predetermined ratio of oscillations per rotation of the cam, and a fare indicator, the provision of electro-magnetic fare indicator operating means, electric circuit means for supplying electric current pulses for operating the electro-magnetic means with a succession of advance movements, means operatively connected with said rotary member and preventing operative movements of the lever during an initial charge period, six switches, first relay means to operate the first and second of said switches which are in circuit with said electro-magnetic means, second relay means energised by closing of the second switch and operating the third switch, said third, fifth and sixth switches being in circuit with said first relay means to operate said electro-magnetic means, means operatively connecting said lever with said fourth and fifth switches for closing these successively on each operative movement of said lever, and means driven according to distance and time for closing the sixth switch after the expiry of a predetermined fare whereby at each operative movement of the lever during a first tariff period the closing of the fourth switch is operative to cause fare advance whereas closing of the fifth switch is ineffective whilst the sixth switch remains open, and at each operative movement of the lever during a second tariff period the closing of the fourth and fifth switches causes two successive fare advance movements to be imparted to the fare indicator while the sixth switch is closed.

2. A taximeter as claimed in claim 1 wherein the means for closing the sixth switch is a rotary device, and means is provided for varying the starting position of the rotary device.

3. A taximeter as claimed in claim 1 including capacitors for delaying opening of the first switch and third switch.

4. A taximeter as claimed in claim 1 having a capacitor in series with the fourth switch for energising the first relay means when the fourth switch closes.

5. A taximeter as claimed in claim 1 having a capacitor in series with the first relay means and third, fifth and sixth switches, and in series with the second relay means and second switch, said second relay means and second switch being in parallel with the third, fifth and sixth switches.

References Cited by the Examiner

UNITED STATES PATENTS 2,637,492 5/53 Winch _____ 235—30
3,075,698 1/63 Fletcher.

FOREIGN PATENTS 772,798 4/57 Great Britain.

LEO SMILOW, *Primary Examiner.*